Patented Oct. 12, 1937

2,095,639

UNITED STATES PATENT OFFICE 2,095,639

PROCESS FOR PREPARATION OF AZO-DYE-STUFFS

Paul Jean André Kienzlé, Nogent-sur-Oise, France, assignor to Compagnie Nationale de Matieres Colorantes et Manufacturers de Produits Chemiques du Nord Reunies, Etablissements Kuhlmann, Paris, France, a corporation of France No Drawing. Application May 20, 1936, Serial No. 80,805. In France June 29, 1935

12 Claims. (Cl. 8—5)

It has been found according to the invention that azo dyestuffs can be formed upon the fibre by treating with diazotizing agents fibres upon which have been applied by any process on the one hand a coupling compound in the form of its alkali salt and on the other hand a condensation product of the character of a Schiff's base and of general formula

R—N=CH—R′ in which R represents an aromatic residue containing no solubilizing group and R′ any radicle containing at least one solubilizing group.

The Schiff's bases will preferably be prepared by condensation according to the known methods of a primary aromatic amine not containing a solubilizing group with an aldehyde containing a solubilizing group but any other method of preparation of compounds of general formula

R—N=CH—R′ where R represents an aromatic residue not containing a solubilizing group and R′ any radicle containing at least one solubilizing group, is likewise applicable for carrying the present invention into effect. It is for example possible to condense an insoluble aromatic amine with an aldehyde free from solubilizing groups and to sulphonate the condensation product thus obtained.

As primary aromatic base not containing solubilizing group and forming one of the components of the Schiff's base preferably there will be used one of those which are utilized for the preparation of insoluble azodyestuffs upon the fibre by the known methods.

As aldehyde forming the other component of the Schiff's base an aliphatic, isocyclic or heterocyclic aldehyde may be employed containing for example one or several sulphonic or carboxylic groups or plurality of OH groups.

As coupling agents particularly utilizable are those which in the state of alkali salts have a certain affinity for the cellulosic fibre like the arylides of beta-hydroxynaphthoic acid, of o-hydroxycarbazole-carboxylic acid, of o-hydroxynaphthocarbazole-carboxylic acids, of beta-hydroxyanthracene carboxylic acids, the arylides of acylacetic acids etc.

The coupling component and the Schiff's base may be applied with or without alkali nitrite simultaneously or independently upon the fibre for example by padding, impregnating or printing.

In particular if alkali nitrite has been applied following what has been said above, upon the fibre with the coupling component, and the Schiff's base, the formation of the azo dyestuff will take place simply for example, by passage through a hot bath containing an acid, by cold padding on the reverse in an acid bath followed by drying upon a drum at a higher temperature, by acid steaming in a Mather-Platt, by ordinary steaming preceded by impregnation with acid vapours etc., in the absence of nitrite upon the fibre, the formation of the azo dyestuff will necessitate a treatment by a diazotization agent for example by a bath containing alkali nitrite and an organic acid.

These developments, suitably chosen, permit at the same time as the mixtures forming the subject of the invention other dyes to be printed upon the fabric, such as substantive dyes, basic dyes, chrome dyes, sulphuric esters of leuco derivatives of vat dyestuffs, etc., or other pastes capable of producing various effects upon the fabric on which they are printed. Thus the most varied processes of printing, discharge or resist may be combined with the characteristic process of the invention without, however, departing from the scope thereof.

It was already known that the Schiff's bases could, by treatment with diazotizing agents, be decomposed giving a diazonium salt, but it could not be foreseen on the other hand that the Schiff's base could be applied upon the fibre without decomposition with an alkali salt of a coupling compound, and, on the other hand, that by this treatment with a diazotizing agent the formation of the insoluble azodyestuff would take place immediately.

Example 1

10 parts of sodium benzaldehyde-2-4-disulphonate are suspended in a solution of 6 parts of p-toluidine in 70 parts of alcohol, the whole is heated under a reflux and with agitation for about 10 hours. The reaction mass which has become slightly yellowish is filtered and washed with alcohol.

12.5 parts of Schiff's base are obtained.

The condensation may likewise be performed in aqueous medium, the reaction product is then obtained by evaporation to dryness of the condensate.

Equimolecular quantities of this base, of beta-hydroxynaphthoic acid anilide and sodium nitrite are mixed in the form of powder.

This powder may serve for printing upon cotton by pasting with caustic soda and a thickener.

After printing the fabric is steamed for five minutes in acid vapour.

A bright red print fast to rubbing is obtained.

Example 2

5.2 parts of sodium benzaldehyde-o-sulphonate and 5 parts of p-toluidine are dissolved in 25 parts of alcohol, the whole is heated under a reflux for 5-7 hours, the reaction product is isolated by evaporation to dryness and washing by means of benzene, 7.7 parts of an almost white product are obtained which is very readily soluble in water.

It may be used in printing as in Example 1 and provides an analogous shade.

Example 3

5 parts of o-phthalaldehydic acid and 5 parts of m-chloraniline are dissolved in 25 parts of alcohol and heated under a reflux for about 5 hours, after cooling there is formed an abundant crystalline precipitate which is filtered and washed in alcohol. The product melts at 172-173° C. and is quite soluble in diluted caustic soda and sodium carbonate. Mixed with sodium nitrite and the sodium salt of a naphthol it likewise has the property of leading to an insoluble azo dyestuff by treatment in the hot with an organic acid, which permits its employment in printing like the sulphonated derivatives of Examples 1 and 2.

A scarlet red print is obtained.

Example 4

140 parts of 4-chlor-o-toluidine and 210 parts of sodium benzaldehyde-o-sulphonate are heated to boiling for 2-3 hours in 250 parts of alcohol. The major part of the alcohol is then distilled. The residue sets into a mass by cooling, this mass is dried at about 60-70° C. The reaction product then has a pulverulent form and is very slightly yellowish. It may if desired be treated with an organic solvent such as benzene to eliminate from it traces of free amine. The content of amine combined with the aldehyde and determined by diazotization is 38.5% (theoretical 42.5%).

The Schiff's base thus obtained is very readily soluble in water giving a solution which gradually hydrolyzes. This hydrolysis may be restrained by the addition of alkali carbonate or caustic alkalies or by the addition of sodium benzaldehyde-o-sulphonate.

Instead of the 4-chlor-o-toluidine, 5-chlor-o-toluidine may likewise be employed, instead of sodium benzaldehyde-o-sulphonate, sodium benzaldehyde-m-sulphonate or sodium benzaldehyde-p-sulphonate may be employed and the reaction be effected in diluted alcohol.

Example 5

110 parts of sodium benzaldehyde-o-sulphonate and 70 parts of 4-chlor-o-toluidine are heated from 2-3 hours to 130-140° C. Almost complete solution is obtained and the water formed during the reaction distills carrying a very small part of the amine. By cooling, the whole sets into a very hard mass which is crushed and pulverized.

The properties of the reaction product are the same as those of the product of Example 4. Its amine content is approximately 36%.

Example 6

40 parts of sodium benzaldehyde-o-sulphonate are suspended in 50 parts of m-chlor-aniline, and the mixture is heated for 3-4 hours at about 130-140° C. In a very short time the aldehyde enters completely into solution and the major part of the water formed during the reaction distills carrying a small quantity of base. By cooling, the condensation product is precipitated partly in the state of large yellowish crystals. By addition of a certain quantity of benzene the precipitation is rendered complete. It is filtered, washed with benzene and dried at about 50-60° C. The yield is about 90% of the theoretical yield and the content of amine combined with aldehyde is 38%.

This Schiff's base has the same properties of solubility and stability as that obtained according to Example 4.

Example 7

70 grams of a mixture formed by 370 parts of the reaction product of Example 4, 330 parts of o-toluidide of beta-hydroxynaphthoic acid, 100 grams of sodium nitrite and 30 grams of sodium carbonate are pasted with 30 ccs. of alcohol and dissolved in the cold with the aid of a mixture of 30 ccs. of caustic soda of 36° Bé. and 30 ccs. of sodium sulphoricinate in 340 ccs. of water. It is then thickened with 500 grams of starch tragacanth.

A cotton fabric is printed by means of this paste, dried, then developed by a short passage through an aqueous bath at 80-90° C. containing per litre 40 ccs. of 80% formic acid and 100 grams of crystallized sodium sulphate.

The shade obtained after soaping at the boil is a full bodied vivid red.

By replacing the o-toluidide by the o-phenetidide of beta-hydroxynaphthoic acid a scarlet is obtained.

The development may likewise take place by foularding on the reverse in an aqueous bath containing per litre 40 ccs. of formic acid, 10 grams of oxalic acid and 50 grams of sodium sulphate, followed by drying on the drum.

Example 8

60 grams of a mixture formed by 320 parts of the product obtained according to Example 6 and 330 parts of the o-toluidide of beta-hydroxynaphthoic acid are pasted with 30 ccs. of alcohol, then dissolved in the cold in a solution containing 30 ccs. of caustic soda of 36° Bé., 30 ccs. of sulphoricinate and 10 grams of sodium nitrite in 290 ccs. of water. It is thickened with 550 grams of starch tragacanth.

After printing and developement as indicated in Example 7 a very full bodied orange is obtained.

Example 9

20 parts of sodium benzaldehyde-2-4-disulphonate are dissolved in the hot in 15 parts of water. To this solution is added 14% of 5-chlor-o-toluidine and 50% of alcohol. The whole which constitutes a perfect solution is heated to boiling for about an hour. It is then evaporated to dryness on the water bath and subsequently treated with a mixture of alcohol and benzene. The Schiff's base precipitates in yellow flakes. The yield is 22.7 parts of the condensation product. This product is very readily soluble in water.

By printing as in the preceding examples by means of a mixture of the Schiff's base above with an arylide of 2-3-hydroxynaphthoic acid and sodium nitrite, there is produced by simple acid steaming the insoluble azo dyestuff upon the fibre.

Example 10

25 grams of Schiff's base obtained by condensation of salicylic aldehyde with 4-chlor-o-toluidine (MP 100–101° C.) are dissolved in 150 ccs. of concentrated sulphuric acid and heated on the water bath for 3–4 hours. After cooling it is poured upon ice, the yellow precipitate is filtered, and washed with a little water and dried at about 60° C. There is thus obtained 30.5 grams of a sulphonated product readily soluble in sodium carbonate or diluted caustic soda. The amine content is 41%.

This sulphonation product dissolved in sodium carbonate to which has been added alkali nitrite and a solution in caustic soda of an arylide of beta-hydroxynaphthoic acid such for example as that derived from o-toluidine, then thickened in a suitable manner, provides, after printing upon fabric and development as has been indicated in the preceding example, a red shade.

Example 11

25 parts of 1-methyl-3-amino-4-methoxy-6-benzoylamino-benzene and 21 parts of sodium benzaldehyde-o-sulphonate are heated at the boil for about an hour in 35 parts of alcohol. It is cooled and the yellow precipitate formed is filtered and dried. The yield of Schiff's base is almost quantitative.

Example 12

30 parts of 1,4-diethoxy-2-amino-8-benzoylamino-benzene and 35 parts of sodium benzaldehyde disulphonate are heated at the boil for about 2 hours in 200 parts of denatured ethyl alcohol and 50 parts of water. The product is then concentrated to small volume by distillation of the solvent and cooled. The crystalline precipitate which forms is filtered, dried at about 50° C. and if desired washed with benzene.

Instead of ethyl alcohol, methyl alcohol may likewise be employed.

The Schiff's base obtained has the form of a yellow-orange powder very stable and very readily soluble in water. Its amine content is about 40%.

Example 13

55 grams of a mixture formed by 740 parts of the condensation product of Example 12, 325 parts of the anilide of beta-hydroxynaphthoic acid, 100 parts of sodium nitrite and 30 parts of sodium carbonate are pasted with 30 ccs. of alcohol and dissolved in the cold in a mixture of 25 ccs. of caustic soda of 36° Bé., 30 ccs. of sulphoricinate, 30 ccs. of thiodiglycol and 230 ccs. of water. It is thickened with 600 grams of starch tragacanth.

The fabric is printed by means of this paste, dried and then developed by a short acid steaming.

The shade obtained after soaping is a very dark blue.

Still more vivid shades may be obtained by incorporating in the printing paste urea or wetting or dispersing agents such as sodium isopropylnaphthalene sulphonate.

In the same way with the product of Example 11 by an analogous method of printing a violet shade is obtained.

Example 14

25 grams of sodium acetalaldehyde disulphonate are dissolved in the hot in 70–80 ccs. of water. To this solution is added 14 grams of 4-chlor-o-toluidine dissolved in 70 ccs. of alcohol. The whole is heated at the boil for about half an hour. By cooling, the condensation product is precipitated in fine colourless needles. After having been diluted with alcohol it is filtered, washed with the same solvent and dried.

The product is quite soluble in cold water and even better in warm water. The content of amine combined with sodium acetalaldehyde disulphonate is 36%.

Example 15

28 grams of 4-chlor-o-toluidine and 36 grams of glucose are heated at the boil in 180 ccs. of methyl alcohol until the whole has entered into solution. The product is then concentrated to small volume by distillation of a part of the solvent. By cooling there is formed an abundant white precipitate which is filtered, briefly washed with a little alcohol or benzene and dried.

The Schiff's base formed is slightly soluble in cold water, and more readily in hot water (30–40° C.) without appreciable decomposition.

By recrystallization in water at 50–60° C. long needles are obtained which melt with decomposition at 124–126° C.

Example 16

60 grams of a mixture formed by 850 parts of the reaction product of Example 14 and 570 parts of the toluidide of acetyl acetic acid and 10 grams of sodium nitrite are pasted with 30 ccs. of alcohol, then dissolved with the aid of 30 ccs. of caustic soda of 36° Bé., 30 ccs. of sulphoricinate and 360 ccs. of warm water. It is thickened with 500 grams of starch tragacanth.

By printing upon the fabric and development either by acid steaming or by passage through an acid bath as indicated in Example 7 a full bodied yellow shade is obtained.

An analogous result is obtained by replacing in the printing paste the product of Example 14, by that of Example 15.

Example 17

Upon a cotton fabric there is printed at the same time as the printing paste described in Example 7 a printing paste comprising tannin and concentrated methylene blue NBI, prepared according to the usual method. The fabric is dried and impregnated with a mixture of acetic and formic acid vapours and steamed for an hour, it is then passed through a tartar-emetic solution and soaped; red designs as well as blue designs are obtained.

What I claim is:

1. A process for preparation of azo dyestuffs upon the fibre consisting in applying upon the fibre at least one coupling compound in the form of its alkali salt, a condensation product of general formula

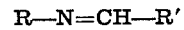

R—N=CH—R' in which R represents an aromatic residue not containing a solubilizing group and R' a radicle containing at least one solubilizing group, and in treating the said fibre with a diazotizing agent.

2. A process for preparation of azo dyestuffs upon the fibre consisting in applying upon the fibre an alkali salt of at least one coupling compound belonging to the group consisting of the arylides of beta-hydroxynaphthoic acid, of o-hydroxycarbazole-carboxylic acid, of beta-hydroxyanthracene carboxylic acids, of o-hydroxynaphthocarbazole carboxylic acids, of acylacetic acids, a condensation product of general formula $$R\text{—}N\text{=}CH\text{—}R'$$

in which R represents an aromatic residue not containing a solubilizing group and R' a radicle containing at least one solubilizing group, and in treating the said fibre with a diazotizing agent.

3. A process for preparation of azo dyestuffs upon the fibre consisting in applying upon the fibre at least one coupling compound in the form of its alkali salt, a condensation product of general formula $$R\text{—}N\text{=}CH\text{—}R'$$

in which R represents an aromatic residue not containing a solubilizing group and R' a radicle containing at least one sulphonic group, and in treating the said fibre by a diazotization agent.

4. A process for preparation of azo dyestuffs upon the fibre consisting in applying upon the fibre at least one coupling compound in the form of its alkali salt, a condensation product of general formula $$R\text{—}N\text{=}CH\text{—}R'$$

in which R represents an aromatic residue not containing a solubilizing group and R' a radicle containing at least one carboxylic group, and in treating the said fibre by a diazotization agent.

5. A process for preparation of azo dyestuffs upon the fibre consisting in applying upon the fibre at least one coupling compound in the form of its alkali salt, a condensation product of general formula $$R\text{—}N\text{=}CH\text{—}R'$$

in which R represents an aromatic residue not containing a solubilizing group and R' a radicle containing a plurality of hydroxyl groups, and in treating the said fibre by a diazotization agent.

6. A process for preparation of azo dyestuffs upon the fibre consisting in applying upon the fibre at least one coupling compound in the form of its alkali salt, a condensation product of general formula $$R\text{—}N\text{=}CH\text{—}R'$$

in which R represents an aromatic residue not containing a solubilizing group and R' a radicle containing at least one solubilizing group and in treating the said fibre with a bath containing an alkali nitrite and an organic acid.

7. A process for preparation of azo dyestuffs upon the fibre consisting in applying upon the fibre a paste constituted by at least one coupling compound in the form of its alkali salt, a condensation product of general formula $$R\text{—}N\text{=}CH\text{—}R'$$

in which R represents an aromatic residue not containing a solubilizing group and R' a radicle containing at least one solubilizing group and an alkali nitrite, and in developing the dye by passage of the fibre through a hot diluted solution of organic acid.

8. A process for preparation of azo dyestuffs upon the fibre consisting in applying upon the fibre a paste constituted by at least one coupling compound in the form of its alkali salt, a condensation product of general formula $$R\text{—}N\text{=}CH\text{—}R'$$

in which R represents an aromatic residue not containing a solubilizing group and R' a radicle containing at least one solubilizing group and an alkali nitrite, and in developing the dye by acid steaming.

9. A process for preparation of azo dyestuffs upon the fibre consisting in applying upon the fibre a paste constituted by at least one coupling compound in the form of its alkali salt, a condensation product of general formula $$R\text{—}N\text{=}CH\text{—}R'$$

in which R represents an aromatic residue not containing a solubilizing group and R' a radicle containing at least one solubilizing group and an alkali nitrite, and in developing the dye by padding in a cold acid bath and drying upon a drum.

10. A process for preparation of azo dyestuffs upon the fibre consisting in applying upon the fibre a paste constituted by at least one coupling compound in the form of its alkali salt, a condensation product of general formula $$R\text{—}N\text{=}CH\text{—}R'$$

in which R represents an aromatic residue not containing a solubilizing group and R' a radicle containing at least one solubilizing group and an alkali nitrite and developing the dye by means of acid vapours and steaming.

11. A mixture in powder or paste form for the printing of fibres or other materials, comprising at least one coupling compound in the form of its alkali salt and a condensation product of general formula $$R\text{—}N\text{=}CH\text{—}R'$$

in which R represents an aromatic residue not containing a solubilizing group and R' a radicle containing at least one solubilizing group.

12. A mixture in powder or paste form for the printing of fibres or other materials, comprising at least one coupling compound in the form of its alkali salt and a condensation product of general formula $$R\text{—}N\text{=}CH\text{—}R'$$

in which R represents an aromatic residue not containing a solubilizing group and R' a radicle containing at least one solubilizing group, and an alkali nitrite.

PAUL JEAN ANDRÉ KIENZLÉ.